United States Patent
Rutkowski et al.

(10) Patent No.: US 7,778,417 B2
(45) Date of Patent: Aug. 17, 2010

(54) SYSTEM AND METHOD FOR MANAGING ENCRYPTED CONTENT USING LOGICAL PARTITIONS

(75) Inventors: Matt F. Rutkowski, Pflugerville, TX (US); Julian A. Cerruti, San Jose, CA (US); Robert B. Chumbley, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 11/130,546

(22) Filed: May 17, 2005

(65) Prior Publication Data
US 2006/0262927 A1 Nov. 23, 2006

(51) Int. Cl.
H04N 7/167 (2006.01)
(52) U.S. Cl. .................. 380/201; 713/168; 713/189; 726/2; 726/18; 726/30
(58) Field of Classification Search .......... 380/201, 380/270, 44, 277, 28; 725/31, 61; 726/30, 726/18, 2, 26; 714/15, 2; 713/168, 189, 713/157, 193
See application file for complete search history.

(56) References Cited

U.S. PATENT DOCUMENTS 6,006,223 A * 12/1999 Agrawal et al. ............. 707/5
2003/0097655 A1 * 5/2003 Novak .......................... 725/31
2003/0200176 A1 * 10/2003 Foster et al. ................. 705/51
2004/0028227 A1 * 2/2004 Yu ............................... 380/201
2004/0168184 A1 * 8/2004 Steenkamp et al. .......... 725/31
2005/0086532 A1 4/2005 Lotspiech et al.

FOREIGN PATENT DOCUMENTS

EP A 1 265 396 12/2002

* cited by examiner

Primary Examiner—Taghi T Arani
Assistant Examiner—Jason Lee
(74) Attorney, Agent, or Firm—Patrick E. Caldwell, Esq.; The Caldwell Firm, LLC

(57) ABSTRACT

The present invention provides a means for managing title keys by establishing logical partitions of title keys encrypted with the same binding information. The invention supports delayed and background processing of title keys when binding information changes. This invention supports proper accounting for devices required to recover rebinding processing when devices fail or go offline unexpectedly during processing. The invention uses binding context which represents a set of data that can be used to determine if the binding information used to encrypt a set of title keys is outdated and allow for rebinding to the current cluster binding information level.

17 Claims, 4 Drawing Sheets

SYSTEM AND METHOD FOR MANAGING ENCRYPTED CONTENT USING LOGICAL PARTITIONS

CROSS-REFERENCE

Copending application Ser. No. 11/130,726, Rutkowski et al, assigned to common assignee, filed May 18, 2005. This reference is hereby incorporated by reference.

TECHNICAL FIELD

The present invention relates to data encryption, and particularly to managing encrypted content using logical partitions by associating title keys with binding information for encrypting said title keys.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is Internet related distribution of documents. The Web or Internet, which had quietly existed for over a generation as a loose academic and government data distribution facility, reached, "critical mass" and commenced a period of phenomenal expansion. With this expansion, businesses and consumers have direct access to all matter of documents and media through the Internet.

With the advent of consumer digital technology, content such as music and movies are no longer bound to the physical media that carry them. Advances in consumer digital technology present new challenges to content owners such as record labels, studios, distribution networks, and artists who want to protect their intellectual property from unauthorized reproduction and distribution. Recent advances in broadcast encryption offer an efficient alternative to more traditional solutions based on public key cryptography. In comparison with public key methods, broadcast encryption requires orders of magnitude less computational overhead in compliant devices. Compliant devices are those which follow the key management protocol defined to govern the behavior of devices participating in a particular content protection system, and which have not been altered or used in attacks designed to compromise that system. In addition, broadcast encryption protocols are one-way, not requiring any low-level handshakes, which tend to weaken the security of copy protection schemes. However, by eliminating two-way communications, the potentially expensive return channel on a receiver may be eliminated, lowering overhead costs for device manufacturers and users.

IBM has developed a content protection system based on broadcast encryption called eXtensible Content Protection, referred to as "xCP." xCP supports a trusted domain called a 'cluster' that groups together a number of compliant devices. Content can freely move among these devices, but it is useless to devices that are outside the cluster. Other examples of broadcast encryption applications include Content Protection for Recordable Media (CPRM) media, Content Protection for Pre-Recorded Media (CPPM) media, and Advanced Access Content System (AACS) next-generation media.

Broadcast encryption schemes bind a piece of content to a particular entity, such as a piece of media (e.g. a compact disk or DVD), a server, a group of authorized devices, or a user. Broadcast encryption binds the content by using a media key block (also known as a key management block KMB or session key block) that allows compliant devices to calculate a cryptographic key (the media or management key) using their internal device keys while preventing circumvention (non-compliant) devices from doing the same. One example of a binding scheme is binding to a specific receiver in standard PKI applications wherein content is encrypted with a session key, which is then encrypted with a receiver's public key. The content can only be retrieved with the receiver's private key. Another example of a binding scheme is binding to a specific media in CPRM and AACS Media wherein content is encrypted with a title key, which is then encrypted with a key resulting from a one-way function of a media identifier and a media key (calculated from the media key block described above). A third example of a binding scheme is binding to a specific group of devices in a user's domain, as in xCP Cluster Protocol, wherein content is encrypted with a title key, which is then encrypted with a key resulting from a one-way function of the user's cluster authorization table and binding ID and the user's current management key (calculated from the user's current media key block).

Broadcast encryption does not require authentication of a device and can be implemented with symmetric encryption, allowing it to be much more efficient than public key cryptography. After calculating a media key by processing the media key block (KMB), the scheme uses the media key to bind the content to an entity with a binding identifier, resulting in the binding key. An indirection step occurs when a title key is then chosen and encrypted or decrypted with the binding key, resulting in an encrypted title key or an encrypted indirected key. The content itself may then be encrypted with the title key and the encrypted content may be stored with the encrypted title key. A compliant device that receives the encrypted content and the encrypted title key may use the same KMB and the binding identifier to decrypt the encrypted title key and then to use that title key to decrypt the content. The compliant device first must reproduce the binding key using the KMB, the binding identifier and its device keys, and then decrypt the title key from the encrypted title key using the binding key. Once the compliant device has the title key, it may decrypt the content itself. A circumvention device will not have device keys that can be used to process the KMB and thus will not be able to reproduce the binding key or be able to decrypt the content. Also, if the content has been copied to a different entity with a different identifier by a non-compliant device, the compliant device with valid device keys will not be able to calculate the correct binding key because the binding identifier is different than the original one.

Under prior art systems, all content would be encrypted with a title key which would itself be encrypted with the binding key. Said content items are owned by a single participant in this key management binding scheme, and is responsible for the re-encryption of said title keys when indirections change that result in a new binding key. For example, the introduction of a new device into an existing network cluster causes an update to an authorization table, i.e. an indirection mechanism on the binding key. Ideally, implementations using broadcast encryption perform a re-encryption procedure on all title keys affected by the binding change. Optimally, re-encryption of said title keys occurs in a timely manner so as not to delay a user's access to associated content. Implementations typically attempt to re-encrypt affected title keys immediately, or without regard to use patterns. If the number of content items affected is large, as can often be the case for devices with entertainment content, the operation is time consuming and causes delay to the user. Additionally, devices that manage content can go offline or be disconnected from the network, either as a matter of normal use or due to some device failure. These failures can occur while rebinding title keys. When the device becomes reconnected, it is responsible for recovering and continuing to rebind the title keys it managed at the point it failed with no loss of content.

The present invention is directed to solving this problem by providing a means to manage title keys by establishing logical partitions of title keys with the same binding information. The method of the present invention provides a means that supports delayed and background processing of title keys when binding information changes. The present invention also supports proper accounting for devices required to recover rebinding processing when devices fail or go offline unexpectedly during said processing.

Therefore, there is a need for an effective and efficient system of managing encrypted content using logical partitions.

SUMMARY OF THE PRESENT INVENTION

The present invention provides a solution to the previously recited problems by a system, method and related computer program for managing encrypted content using logical partitions of the encrypted content's encrypted title keys. More particularly, the present invention provides a means for supporting delayed and background processing of encrypted title keys when binding information changes, as well as support proper accounting for devices recovering the state of the rebinding processing when devices fail or go offline unexpectedly during processing. The present invention controls access to and storage of encrypted content and their associated encrypted title keys by content provider service, which can partition title keys based upon binding contexts that identify the unique set of binding information used to encrypt the set of title keys in a given partition. The content provider need not store the encrypted content with their associated encrypted title keys directly as long as the content provider can maintain an association between the encrypted title key and the encrypted content. The content binding service has the ability to determine "currency" of binding information from the information contained within the binding context and is able to use the information within the context to reference the actual binding information needed to decrypt encrypted title keys. When access to encrypted content is requested the content provider identifies the logical partition of which requested content's encrypted title key is a member. The content binding service can use the binding context associated with the partition to determine if binding information used for encryption of title keys in that partition is outdated. If the context binding information is current, the encrypted title key and the encrypted content are returned to the content binding service, which decrypts the encrypted title key and then decrypts the encrypted content itself using the title. Decrypted content is then provided to a rendering service on a device. If the context binding information is outdated, the content provider requests that the content binding service re-encrypt the title key with the current set of binding information. The binding service has the ability to reference or recreate the older sets of binding information from information contained within the binding contexts associated with the partitions to which encrypted title keys belong. The content binding service can then decrypt the title with an older set of binding information and re-encrypt the title key with the current set of binding information. The content provider service can then re-partition the encrypted title key with the current set of binding information into a partition associated with the current binding context by associating the newly encrypted title key with the current partition, removing association of the content from previous partition, and monitoring remaining content associated with requested content which is in a partition with outdated content context. If a logical partition with the current binding information does not yet exist it can be created at this time. The content provider reserves the right to rebind the remaining title keys in the outdated partition to which the requested title key previously belonged or mark the partition as "outdated" and schedule the partition to rebind the remaining title keys at a later time. In the present invention, content context for partition associated with current binding information for device is retrieved via content binding service. Access to the content can also be through the content provider directly as long as the content provider has access to the content binding service to perform the same rebinding operations prior to granting access to a renderer. Please note that if the content does not need to be rendered (i.e. viewed or played), but simply transferred to other devices that have access to the same binding scheme and provides for the same processing as described within this invention, the encrypted title keys do not need to be rebound to succeed in a transfer since the other device's binding service can perform the same rebinding operations when rendering is required at a later time. This type of transfer of encrypted content can be performed by the content provider directly or indirectly via the content binding service.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
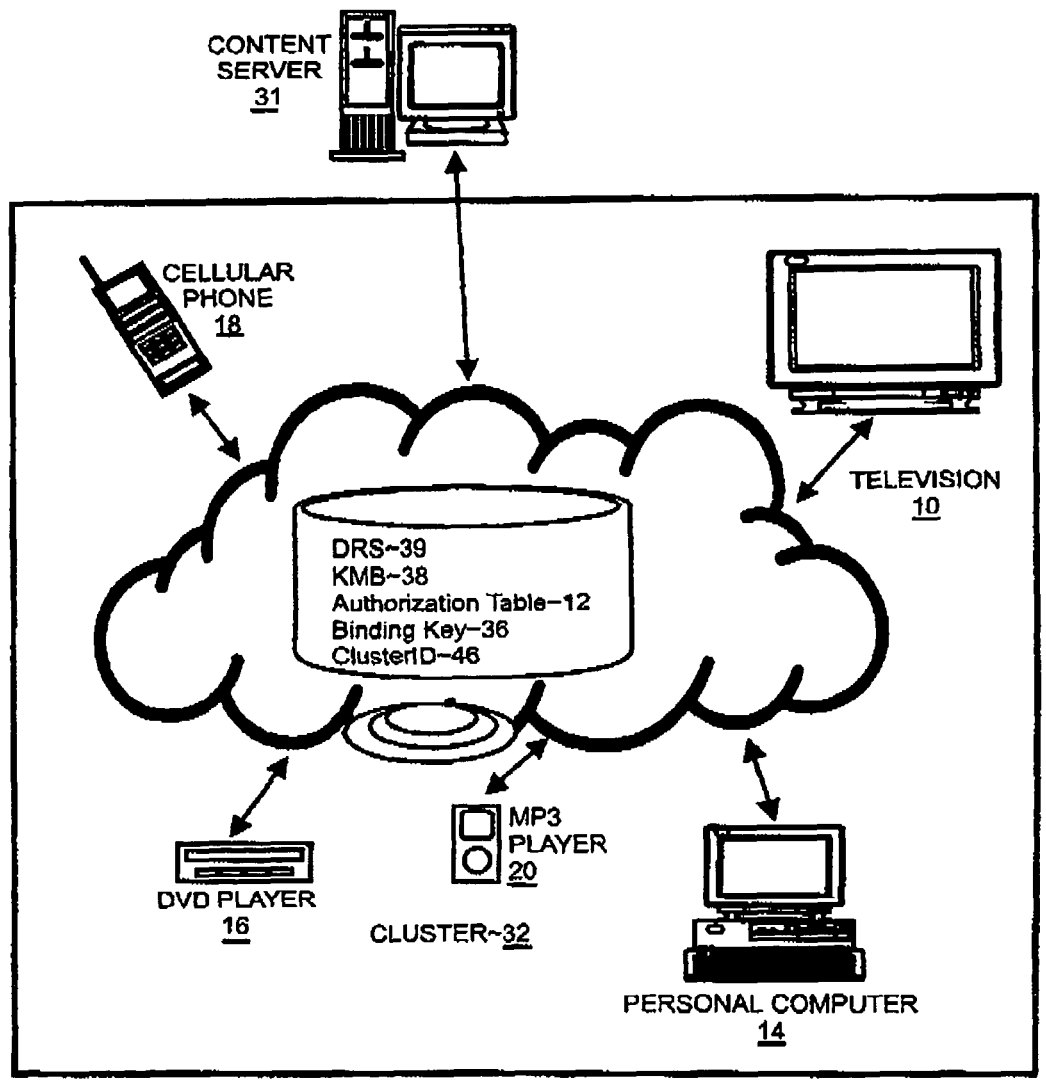
FIG. 1 is a line drawing of an exemplary network architecture in which methods and systems according to embodiments of the present invention may be implemented.

Referring to FIG. 1, a line drawing of exemplary network architecture is shown in which methods and systems according to embodiments of the present invention may be implemented. While the present invention is operable with various binding schemes, such as binding to a specific receiver in standard PKI applications, binding to a specific media in CPRM and AACS Media, FIG. 1 shows the binding scheme wherein the binding is to a specific user's content in xCP Cluster Protocol. The network of FIG. 1 includes an xCP compliant network cluster 32 that includes several xCP compliant network devices including a cellular telephone 18, a television 10, a DVD player 16, a personal computer 14, and an MP3 player 20. The network may be any type of wired or wireless network, such as Local Area Network (LANS) or Wide Area Networks (WANS). Content may be any data deliverable from a source to a recipient and may be in the form of files such as an audio data file, a video data file, a media data file, a streaming media file, an application file, a text file, or a graphic. An encryption system allows receiving devices within the home network to freely share and utilize encrypted content between them while preventing non-compliant devices from decrypting the encrypted content. A receiving device may optionally be able to record content onto a recorded device for use outside the home network.

The network cluster supports a key management block 38 for the cluster, an authorization table 12 that identifies all the devices currently authorized to join in the cluster, a binding key 36 for the cluster, and a cluster ID 46. The key management block 38 is a data structure containing an encryption of a management key with every compliant device key. That is, the key management block contains a multiplicity of encrypted instances of a management key, one for every device key in the set of device keys for a device. The binding key 36 for the cluster is calculated as a cryptographic one-way function of a management key and a cryptographic hash of a cluster ID and a unique data token for the cluster. The management key for the cluster is calculated from the key management block 38 and device keys.

The network of FIG. 1 includes a content server 31 that is capable of encrypting content with title keys provided to it by content providers, content owners, or a legal licensing authority. Content server 31 is also capable of calculating a binding key for a cluster, given enough information about the cluster, and using the binding key 36 to encrypt a title key and package it with encrypted contents. More particularly, content server 31 may control broadcast encryption of content for a network cluster 32 from outside the cluster by receiving from a network device in the cluster a key management block 38 for the cluster 32, a unique data token for the cluster 32, and an encrypted cluster ID. The content server is capable of using the key management block 38 for the cluster 32, the unique data token for the cluster 32, and the encrypted cluster ID to calculate the binding key for the cluster.

The network of FIG. 1 further includes a digital rights server 39 that is capable of storing rights objects that define rights for the broadcast encryption content. In addition, a digital rights server 39 is also capable of calculating a binding key for a cluster, given enough information about the cluster, and using the binding key to encrypt a title key and insert it into a rights object. More particularly, if a third party DRM solution exists, the present invention is compatible with said third party DRM solution to control broadcast encryption of content for a network cluster 32 from outside the cluster by encrypting a title key with a binding key 36, and inserting the encrypted title key into the rights object. At this point, an external check could be made to the third party DRM solution prior to making content available from a participating device. If a DRM solution is present, access is granted or denied based upon unique identification of encrypted content from the requesting device. A digital rights server may be capable of using a key management block 38 for the cluster 32, a unique data token for the cluster 32, and an encrypted cluster ID to calculate a binding key for the cluster.

Figure 2:
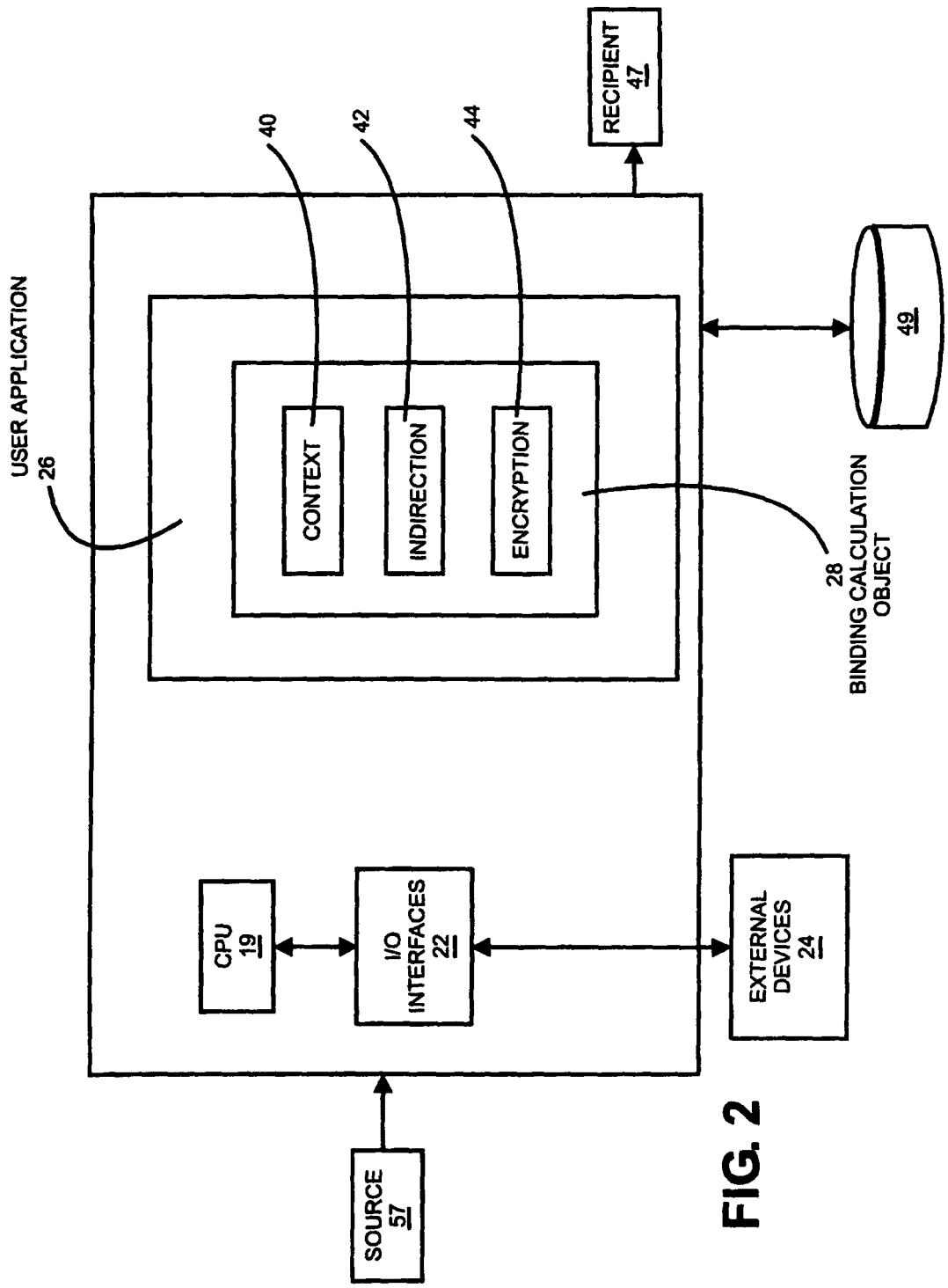
FIG. 2 is a generalized view of a system that may be used in the practice of the present invention.

A generalized diagram of an encryption management system that may be used in the practice of the present invention is shown in FIG. 2. The cryptographic system may be any combination of hardware and/or software that may perform one or more of such tasks as encrypting or decrypting, and attaching a key to content. A typical cryptographic system may be a general purpose computer with a computer program that, when loaded and executed, carries out the methods described herein. Alternatively, cryptographic system may be a specific use computer system containing specialized hardware for carrying out one or more of the functional tasks of the cryptographic system. A specific use computer system may be part of a receiving device, for example, such as an encryption/decryption module associated with a DVD player. Cryptographic system may include one or more central processing units (CPUs 19), an input/output (I/O) interface 22, a user application 26 that includes a binding calculation object 28 wherein a context key 40, indirection key(s) 42, and encryption key 44 are found, external devices 24, and a database 49.

Cryptographic system may also be in communication with a source 57 or a recipient 47. Source 57 may be the source of any content to be encrypted or decrypted or any entity capable of sending transmissions, such as a content owner, a content service provider, or a receiver in a home network. Information received from a source 57 may include any type of information, such as encrypted content, content, content usage conditions, a KMB, encrypted title keys, or binding identifiers. Similarly, a recipient 47 may be any entity capable of receiving transmissions or that is a destination for any encrypted content or other information, such as a receiver in a home network.

CPU 19 may include a single processing unit or may be distributed across one or more processing units in one or more locations, such as on a client and server or a multi-processor system. I/O interface 22 may include any system for exchanging information with an external source. External devices 24 may include any known type of external device, such as speakers, a video display, a keyboard to other user input device, or a printer. Database 49 may provide storage for information used to facilitate performance of the disclosed embodiment. Database 49 may include one or more storage devices, such as a magnetic disk drive or optional disk drive.

User application 26 may include components of application specific information, such as media ID, or authorization table. Binding calculation object 28 may include a context key 40 that is set up via a user's specific information, one or more indirection keys 42, and a final encryption key 44 used to encrypt content. The binding calculation object 28 can be reused in several various applications and is a standard defined mechanism. This standard defined mechanism can be used to create trusted entities that handle a state of a binding transaction for an application. Secret information, such as title keys, media keys, or session keys, can be kept inside these trusted entities (binding calculation objects) decreasing the security risks of transmitting sensitive information in application components. Specific measures can be taken to detect and prevent decryption of title keys outside of the trusted entities.

The binding calculation object or trusted cryptography object 28 can be implemented as a trusted software component that executes in a trusted operating system environment. For example, a computer system could be supplied with a trusted Java Virtual Machine (Java is a trademark of Sun Microsystems, Inc.) whose execution options are known and controlled by the system owner. In the alternative, binding calculation object 28 can be embodied in a read only memory device or application specific hardware device to ensure that no compromising operations can be performed. The advantage is that the decrypted secret information such as the title key is always maintained in the binding object 28 with external access blocked and thus cannot be compromised.

Figure 3:
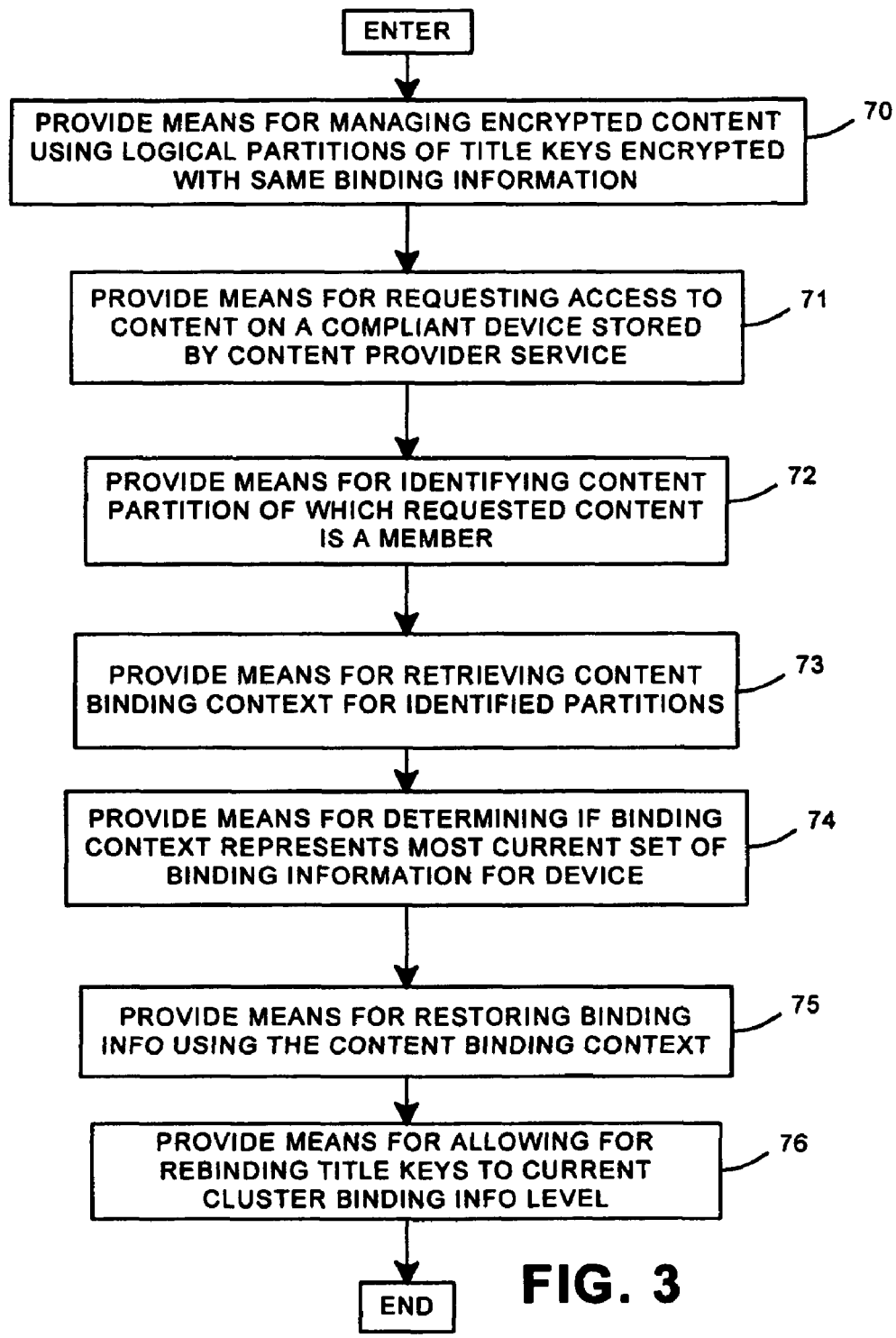
FIG. 3 is an illustrative flowchart describing setting up of the functions for managing encrypted content using logical partitions of the present invention.

FIG. 3 is a flowchart showing the development of a process according to the present invention for managing encrypted content using logical partitions. Means are provided for managing encrypted content using logical partitions of title keys encrypted with binding information, step 70. Means are provided for requesting access to content on a compliant device stored by content provider service, step 71. A user can choose to manage the encrypted title keys of the encrypted content in these partitions. A user may choose to manage the encrypted content in these partitions, but can also have a reference to the encrypted content in another location. Means are provided for identifying content partition of which requested content is a member, step 72. One binding scheme that could be used with the present invention is xCP. Means are provided for retrieving content binding context for identified partitions, step 73. Means are provided for determining if binding context represents most current set of binding information for device, step 74. Means are provided for restoring binding information using the content binding context, step 75. Means are provided for allowing for rebinding title keys to current cluster binding information level, step 76.

The content binding service can allow users to provide preferences when content can optimally be rebound, e.g. at times of low usage. The provider can allow for time intervals to be set by the user that when the period occurs, a binding currency check is made for content contexts associated with content partitions it manages. Re-encryption of large sets of title keys can occur on different threads at lower priorities to match the device's processing capabilities or to defer to times when the device's processing capabilities permit.

A simplified run of the process set up in FIG. 3 will now be described in with respect to the flowchart of FIG. 4. First, a determination is made regarding whether to manage encrypted content using logical partitions, step 80. If No, the process ends since we only describe a process using logical partitions with regard to FIG. 4. If Yes, access is requested to content stored by content provider service, step 81. When content is acquired by a device and stored directly or indirectly (e.g. from a content server via the content binding service) to the content provider, the content provider is always provided the encrypted content, encrypted title key, and the binding context which it can use to partition the encrypted content and encrypted title keys. It should be noted that partitions can be actual physical partitions mapped to physical storage media or logical partitions which can maintain an association to the physical location where the actual content and title keys reside. The partition is identified of which requested content is a member, step 82. A determination is made regarding whether the binding information used for encryption of title keys is outdated using the binding context associated with that partition, step 83. If Yes, the content provider requests that the title key encrypted with outdated binding information be re-encrypted by content binding service, step 84. The content provider presents the outdated binding context associated with the logical partition the title key was a member of to the binding service, step 85. The content binding service uses the outdated binding context to recover outdated binding material and uses it to decrypt the outdated title key, step 86. The binding service then re-encrypts the title key with the current set of binding information for the cluster, step 87. The content binding service returns the re-encrypted title key and current binding context to the content provider, step 88. The content provider re-partitions the title key to the "current" logical partition, creating a "current" partition if one does not yet exist, step 89, and either chooses to rebind each title key in the outdated partition or marks the partition as being outdated and defers its binding (on a schedule determined by the compliant device or user).

Figure 4:
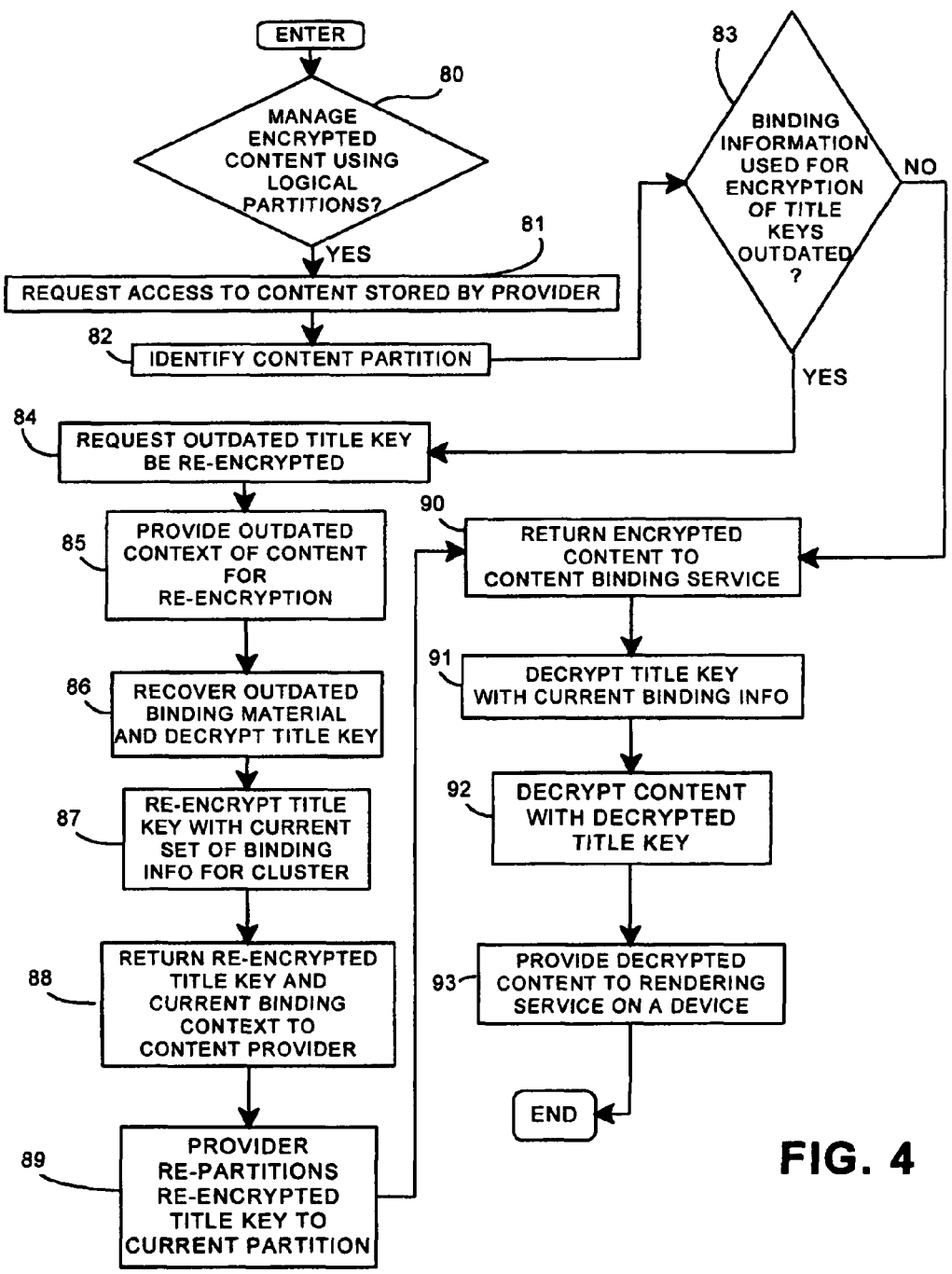
FIG. 4 is a flowchart of an illustrative run of the program set up according to FIG. 3.

Further in FIG. 4, when the content provider service identifies the partition with current content context, the content and newly encrypted title key are associated with the partition. Association of the content and keys are removed from the previous partition, and remaining content associated with requested content which is in a partition with outdated content context is marked and monitored. The content binding service can comprise a notification system for the content provider service to provide real time determination of binding changes. A content provider can opt to rebind (as in steps 84-89) the title keys within partitions at the time of notification by the content binding service's notification system. Alternatively, a content provider can opt to defer rebinding title keys at the time of the notification by the content binding service's notification system flagging the partition and associated content and title keys for a future update interval.

If No, the binding information used for encryption of title keys is not outdated, then the encrypted title key and encrypted content is returned to content binding service, step 90, and title key is decrypted by content binding service with current binding information, step 91. Then the decrypted title key is used to decrypt the content itself, step 92. Decrypted content is provided to the rendering service (including but not limited to audio and/or video) on the compliant device (e.g. DVD player, MP3 player, or the like), step 93, then the process ends.

The present invention is described in this specification in terms of methods for the secure and convenient handling of cryptographic binding state information. One skilled in the art should appreciate that the processes controlling the present invention are capable of being distributed in the form of computer readable media of a variety of forms. The invention may also be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Although certain preferred embodiments have been shown and described, it will be understood that many changes and modifications may be made therein without departing from the scope and intent of the appended claims.

The invention claimed is:

1. A method for managing encrypted content using logical partitions of title keys encrypted with same binding information, the method comprising:

partitioning title keys into logical partitions based upon binding contexts that identify a unique set of binding information used to encrypt a set of title keys in a logical partition;

requesting access to content on a compliant device stored by a content provider service;

identifying a logical partition of which an encrypted title key of the requested content is a member;

retrieving a content binding context associated with the identified logical partition;

determining if the binding context represents a most current set of binding information for the device based on the binding context associated with the identified logical partition; and if the binding information is outdated:

requesting title keys encrypted with outdated binding information be re-encrypted by a content binding service;

decrypting the title key using the outdated binding information;

re-encrypting the title key with a current set of binding information for a cluster;

returning the re-encrypted title key and the current binding context to the content provider; and re-partitioning the re-encrypted title key to a current partition.

2. The method of claim 1 wherein the binding information is current, comprising:
returning the encrypted content to a content binding service;
decrypting the title key;
decrypting the content with the decrypted title key; and
providing decrypted content to a rendering service on the device.

3. The method of claim 1 wherein the content provider service identifies the partition with current content context, comprising:
associating the encrypted content and newly encrypted title key with the partition with a current content binding context;
removing an association of the encrypted content and outdated encrypted title key from a previous partition;
marking remaining encrypted content and title keys in the previous partition from which requested content was disassociated as outdated; and
monitoring remaining encrypted content and encrypted title keys within the partition marked with outdated content binding context.

4. The method of claim 3 wherein the content binding service comprises a notification system for the content provider service to provide a real time determination of binding changes.

5. The method of claim 4 wherein a user can opt to rebind title keys at the time of notification by the content binding service's notification system moving them to a newly created partition.

6. The method of claim 4 where a user can opt to defer rebinding title keys at the time of the notification by the content binding service's notification system flagging content for a future update interval.

7. A system for managing encrypted content using logical partitions of title keys encrypted with same binding information, comprising:
means for partitioning title keys into logical partitions based upon binding contexts that identify a unique set of binding information used to encrypt a set of title keys in a logical partition;
means for requesting access to content on a compliant device stored by content provider service;
means for identifying a logical partition of which an encrypted title key of the requested content is a member;
means for retrieving content binding context associated with the identified logical partition;
means for determining if the binding context represents a most current set of binding information for the device based on the binding context associate with the identified logical partition; and
means for, if the binding information is outdated:
requesting title keys encrypted with outdated binding information be re-encrypted by a content binding service;
decrypting the title key using the outdated binding information;
re-encrypting the title key with a current set of binding information for a cluster;
returning the re-encrypted title key and the current binding context to the content provider; and
re-partitioning the re-encrypted title key to a current partition.

8. The system of claim 7 wherein the binding information is current, comprising:
means for returning the encrypted content to a content binding service;
means for decrypting the title key;
means for decrypting the content with the decrypted title key; and
means for providing decrypted content to a rendering service on a device.

9. The system of claim 7 wherein the content provider service identifies the partition with current content context, comprising:
means for associating the encrypted content and newly encrypted title key with a current content binding context;
means for removing an association of the encrypted content and outdated encrypted title key from a previous partition;
means for marking remaining encrypted content and title keys in the previous partition from which requested content was disassociated as outdated; and
means for monitoring remaining encrypted content and encrypted title keys within the partition marked with outdated content binding context.

10. The system of claim 9 wherein the content binding service comprises a notification system for the content provider service to provide a real time determination of binding changes.

11. The system of claim 10 wherein a user can opt to rebind title keys at the time of notification by the content binding service's notification system moving them to a newly created partition.

12. The system of claim 10 where a user can opt to defer rebinding title keys at the time of the notification by the content binding service's notification system flagging content for a future update interval.

13. A computer program having code recorded on a non-transitory computer readable medium for fast communication with a symbol linked object based system for managing encrypted content using logical partitions of title keys encrypted with same binding information, comprising:
means for partitioning title keys into logical partitions based upon binding contexts that identify a unique set of binding information used to encrypt a set of title keys in a logical partition;
means for requesting access to content on a compliant device stored by content provider service;
means for identifying a logical partition of which an encrypted title key of the requested content is a member;
means for retrieving content binding context associated with the identified logical partition;
means for determining if the binding context represents a most current set of binding information for the device based on the binding context associate with the identified logical partition; and
means for, if the binding information is outdated:
requesting title keys encrypted with outdated binding information be re-encrypted by a content binding service;
decrypting the title key using the outdated binding information;
re-encrypting the title key with a current set of binding information for a cluster;
returning the re-encrypted title key and the current binding context to the content provider; and
re-partitioning the re-encrypted title key to a current partition.

14. The computer program having code recorded on a non-transitory computer readable medium of claim 13 wherein the binding information is current, comprising:
- means for returning the encrypted content to a content binding service;
- means for decrypting the title key;
- means for decrypting the content with the decrypted title key; and
- means for providing decrypted content to a rendering service on the device.

15. The computer program having code recorded on a non-transitory computer readable medium of claim 13 wherein the content provider service identifies the partition with current content context, comprising:
- means for associating the encrypted content and newly encrypted title key with a current content binding context;
- means for removing an association of the encrypted content and outdated encrypted title key from a previous partition;
- means for marking remaining encrypted content and title keys in the previous partition from which requested content was disassociated as outdated; and
- means for monitoring remaining encrypted content and encrypted title keys within the partition marked with outdated content binding context.

16. The computer program having code recorded on a non-transitory computer readable medium of claim 15 wherein the content binding service comprises a notification system for the content provider service to provide a real time determination of binding changes.

17. The computer program having code recorded on a non-transitory computer readable medium of claim 16 wherein a user can opt to rebind title keys at the time of notification by the content binding service's notification system moving them to a newly created partition.

* * * * *